(12) United States Patent
Bontu et al.

(10) Patent No.: US 9,591,679 B2
(45) Date of Patent: Mar. 7, 2017

(54) INITIATION OF INTER-DEVICE COMMUNICATION IN WIRELESS COMMUNICATION SYSTEMS

(71) Applicant: Blackberry Limited, Waterloo, Ontario (CA)

(72) Inventors: Chandra Sekhar Bontu, Kanata (CA); Yu Song, Irving, TX (US); Zhijun Cai, Irving, TX (US)

(73) Assignee: BlackBerry Limited, Waterloo, Ontario (CA)

(*) Notice: Subject to any disclaimer, the term of this patent is extended or adjusted under 35 U.S.C. 154(b) by 134 days.

(21) Appl. No.: 13/621,703

(22) Filed: Sep. 17, 2012

(65) Prior Publication Data

US 2014/0078952 A1 Mar. 20, 2014

(51) Int. Cl.
*H04H 20/71* (2008.01)
*H04W 76/02* (2009.01)
*H04W 76/04* (2009.01)
*H04W 92/12* (2009.01)

(52) U.S. Cl.
CPC ........ *H04W 76/023* (2013.01); *H04W 76/043* (2013.01); *H04W 92/12* (2013.01)

(58) Field of Classification Search
USPC ........................................ 370/312, 328, 254
See application file for complete search history.

(56) References Cited

U.S. PATENT DOCUMENTS

| | | | |
|---|---|---|---|
| 6,925,286 B1 | 8/2005 | Kraiem | |
| 8,515,500 B2 | 8/2013 | Das et al. | |
| 8,582,593 B2 | 11/2013 | Chen et al. | |
| 8,631,466 B2 | 1/2014 | Cha et al. | |
| 2002/0111144 A1 | 8/2002 | Schiff | |
| 2004/0209634 A1 | 10/2004 | Hrastar | |
| 2005/0026597 A1* | 2/2005 | Kim | H04W 48/12 455/412.1 |

(Continued)

FOREIGN PATENT DOCUMENTS

| | | |
|---|---|---|
| CN | 102217411 | 10/2011 |
| CN | 102340829 | 2/2012 |

(Continued)

OTHER PUBLICATIONS

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

(Continued)

*Primary Examiner* — Kwang B Yao
*Assistant Examiner* — Hardikkumar Patel
(74) *Attorney, Agent, or Firm* — Fish & Richardson P.C.

(57) ABSTRACT

Systems, methods, and apparatuses for initiation of inter-device communication in wireless communication systems are provided. Both a user equipment (UE) and a network entity may initiate a direct inter-device communication link between UEs located in proximity. The UE may simultaneously maintain an active communication link with its serving base station while communicating with other UEs over the inter-device communication link. Long term evolution (LTE) downlink or uplink radio resources may be used for communications over the inter-device communication link.

24 Claims, 4 Drawing Sheets

(56) References Cited

U.S. PATENT DOCUMENTS

| | | |
|---|---|---|
| 2005/0111383 A1 | 5/2005 | Grob et al. |
| 2005/0239451 A1 | 10/2005 | Periyalwar et al. |
| 2006/0075263 A1 | 4/2006 | Taylor |
| 2006/0190470 A1 | 8/2006 | Lemnotis |
| 2007/0040813 A1 | 2/2007 | Kushler |
| 2007/0129076 A1 | 6/2007 | Cho et al. |
| 2008/0002658 A1 | 1/2008 | Soliman |
| 2008/0069063 A1 | 3/2008 | Li et al. |
| 2009/0075630 A1 | 3/2009 | Mclean |
| 2009/0119776 A1 | 5/2009 | Palnitkar et al. |
| 2010/0009675 A1 | 1/2010 | Wijting et al. |
| 2010/0095123 A1 | 4/2010 | He |
| 2010/0240312 A1 | 9/2010 | Pend et al. |
| 2010/0279672 A1 | 11/2010 | Koskela et al. |
| 2011/0081908 A1 | 4/2011 | Michaelis et al. |
| 2011/0143771 A1 | 6/2011 | Edge et al. |
| 2011/0145421 A1* | 6/2011 | Yao .................. H04W 76/023 709/228 |
| 2011/0147462 A1 | 6/2011 | Speich |
| 2011/0159799 A1 | 6/2011 | Chen et al. |
| 2011/0194530 A1 | 8/2011 | Tinnakornsrisuphap et al. |
| 2011/0216739 A1 | 9/2011 | Lee et al. |
| 2011/0258313 A1 | 10/2011 | Mallik et al. |
| 2011/0268004 A1 | 11/2011 | Doppler et al. |
| 2011/0275382 A1 | 11/2011 | Hakola et al. |
| 2011/0294474 A1 | 12/2011 | Barany et al. |
| 2011/0317569 A1 | 12/2011 | Kneckt et al. |
| 2012/0026971 A1 | 2/2012 | Khandelia et al. |
| 2012/0044865 A1* | 2/2012 | Singh .................. H04W 24/02 370/328 |
| 2012/0051315 A1 | 3/2012 | Wang et al. |
| 2012/0093070 A1* | 4/2012 | Huang ................ H04B 7/2606 370/315 |
| 2012/0163235 A1 | 6/2012 | Ho et al. |
| 2012/0163252 A1 | 6/2012 | Ahn et al. |
| 2012/0179789 A1 | 7/2012 | Griot et al. |
| 2012/0240216 A1 | 9/2012 | Gutierrez |
| 2013/0003629 A1 | 1/2013 | Jeong et al. |
| 2013/0028235 A1* | 1/2013 | Barrett .................. H04W 60/04 370/331 |
| 2013/0038537 A1 | 2/2013 | Nishii |
| 2013/0046544 A1 | 2/2013 | Kay |
| 2013/0159522 A1 | 6/2013 | Hakola et al. |
| 2013/0160101 A1 | 6/2013 | Hakola et al. |
| 2013/0315196 A1 | 11/2013 | Lim et al. |
| 2013/0329689 A1 | 12/2013 | Choi et al. |
| 2014/0004796 A1 | 1/2014 | Cakulev et al. |
| 2014/0010175 A1 | 1/2014 | Chiu |
| 2014/0022986 A1* | 1/2014 | Wu .................... H04W 48/16 370/328 |
| 2014/0078971 A1 | 3/2014 | Bontu et al. |
| 2014/0086152 A1 | 3/2014 | Bontu et al. |
| 2014/0086153 A1 | 3/2014 | Bontu et al. |
| 2014/0086157 A1 | 3/2014 | Bontu et al. |
| 2014/0106707 A1 | 4/2014 | Bontu et al. |
| 2014/0115522 A1 | 4/2014 | Kataoka |
| 2014/0122607 A1 | 5/2014 | Fodor et al. |
| 2014/0140296 A1 | 5/2014 | Choi et al. |
| 2014/0153390 A1 | 6/2014 | Ishii et al. |
| 2014/0342738 A1 | 11/2014 | Ishii et al. |
| 2015/0036495 A1* | 2/2015 | Venkatachalam ..... H04W 4/005 370/235 |
| 2015/0131475 A1* | 5/2015 | Van Phan ............ H04W 84/18 370/254 |

FOREIGN PATENT DOCUMENTS

| | | | |
|---|---|---|---|
| EP | 1063785 | 12/2000 | |
| EP | 2665299 | 11/2013 | |
| FI | WO 2009138820 A1 * | 11/2009 | ........ H04W 72/0406 |
| FI | WO 2010007498 A1 * | 1/2010 | .......... H04W 76/023 |
| JP | 2001044932 | 2/2001 | |
| KR | 20120074251 | 7/2012 | |
| WO | 00/27045 | 5/2000 | |
| WO | 2009/138820 A1 | 11/2009 | |
| WO | WO 2009138820 A1 * | 11/2009 | ............ H04W 72/04 |
| WO | 2010/007498 A1 | 1/2010 | |
| WO | WO 2010007498 A1 * | 1/2010 | |
| WO | 2010/059856 | 5/2010 | |
| WO | 2011/036507 A1 | 3/2011 | |
| WO | 2011050519 | 5/2011 | |
| WO | 2011/147462 | 12/2011 | |
| WO | 2012/052911 | 4/2012 | |
| WO | 2012060934 | 5/2012 | |
| WO | 2012/088470 A1 | 6/2012 | |

OTHER PUBLICATIONS

3GPP TS 36.211 V10.3.0 (Sep. 2011) Technical Specification: Evolved Universal Terrestrial Radio Access (E-UTRA); Physical Channels and Modulation (Release 10).

3GPP TS 36.212 V10.1.0 (Mar. 2011) Technical Specification: Evolved Universal Terrestrial Radio Access (E-UTRA); Multiplexing and channel coding (Release 10).

3GPP TS 36.213 V10.1.0 (Mar. 2011) Technical Specification: Evolved Universal Terrestrial Radio Access (E-UTRA); Physical layer procedures (Release 10).

3GPP TS 36.331 V10.1.0 (Mar. 2011) Technical Specification: Evolved Universal Terrestrial Radio Access (E-UTRA); Radio Resource Control (RRC); Protocol specification (Release 10).

International Search Report for Application No. PCT/US2013/026104, dated Jun. 24, 2013, 13 pages.

3GPP Standard; 3GPP TS 36.331,V11.1.0; 3rd Generation Partnership Project; Technical Specification Group Radio Access Network; Evolved Universal Terrestrial Radio Access (E-UTRA); Radio Resource Control (RRC); Protocol specification (Release 11); Sep. 2012; 325 pages.

Fodor et al., "Design Aspects of Network Assisted Device-to-Device Communications" IEEE Communications Magazine, IEEE Service Center, Piscataway, US, vol. 50, No. 3, Mar. 1, 2012 (Mar. 1, 2012), pp. 170-177; 8 pages.

"Lei Lei et al: "Operator controlled device-to-device communications in LTE-advanced networks", IEEE Wireless Communications, IEEE Service Center, Piscataway, NJ, US, vol. 19, No. 3, Jun. 2012; 9 pages".

Intel: "Pro se Use Case for Unidirectional D2D Communication", A 3GPP Draft; S1-120065; 3GPP TSG-SA WG1, Meeting #57; Kyoto, Japan; Feb. 2012; 3 pages.

Office Action issued in U.S. Appl. No. 13/624,736 on Aug. 27, 2014; 14 pages.

International Search Report for Application No. PCT/US2013/026157, dated Jul. 30, 2013, 24 pages.

International Search Report for Application No. PCT/US2013/026174, dated Jul. 17, 2013, 5 pages.

International Search Report for Application No. PCT/US2013/026372, dated Apr. 24, 2013, 3 pages.

International Search Report for Application No. PCT/US2013/026356, dated Jun. 19, 2013, 3 pages.

International Search Report for Application No. PCT/US2013/026382, dated Jul. 11, 2013, 5 pages.

Search Report issued in TW Application No. 102132479 on Nov. 7, 2014, 1 page.

United States Office Action in U.S. Appl. No. 13/627,647, dated Mar. 13, 2015, 38 pages.

Office Action and Search Report issued in TW Application No. 102132483 on Dec. 25, 2014; 8 pages.

Office Action issued in U.S. Appl. No. 13/652,011 on Jan. 23, 2015.

Office Action and Search Report issued in Taiwanese Application No. 102132482 on Dec. 26, 2014; 9 pages.

Office Action and Search Report issued in Taiwanese Application No. 102132487 on Dec. 26, 2014; 12 pages.

International Preliminary Report on Patentability in International Application No. PCT/US2013/026174, dated Apr. 2, 2015, 13 pages.

Taiwanese Office Action and Search Report in Taiwanese Application No. 102132478, dated Jan. 22, 2015, 11 pages.

(56) References Cited

OTHER PUBLICATIONS

International Preliminary Report on Patentability in International Application No. PCT/US2013/026157, dated Apr. 2, 2015, 17 pages.
International Preliminary Report on Patentability in International Application No. PCT/US2013/026382, dated Apr. 2, 2015, 10 pages.
International Preliminary Report on Patentability in International Application No. PCT/US2013/026372, dated Mar. 31, 2015, 8 pages.
International Preliminary Report on Patentability in International Application No. PCT/US2013/026356, dated Apr. 30, 2015, 7 pages.
Office Action issued in related Korean Application No. 10-2015-7012597 on Mar. 18, 2016.
Office Action issued in related Korean Application No. 10-2015-7010012 on Apr. 19, 2016.
Communication Pursuant to Article 94(3) EPC issued in related European Application No. 13707754.1 on Apr. 11, 2016.
Office Action issued in related Chinese Application No. 201380060975.7 on May 5, 2016.
Office Action issued in Korean Application No. 10-2015-7010443 on May 27, 2016.
Notice of Allowance issued in Korean Application No. 10-2015-7010010 on Jun. 27, 2016.
Office Action issued in Korean Application No. 10-2015-7010012 on Sep. 6, 2016.
Communication Pursuant to Article 94(3) EPC issued in European Application No. 13707748.3 on Oct. 18, 2016.
Office Action issued in Korean Application No. Oct. 2015-7010443 on Nov. 25, 2016.
Office Action issued in Chinese Application No. 201380060975.7 on Dec. 5, 2016.

\* cited by examiner

INITIATION OF INTER-DEVICE COMMUNICATION IN WIRELESS COMMUNICATION SYSTEMS

TECHNICAL FIELD

The present disclosure generally relates to communications in wireless communication systems, and more particularly, to initiation of inter-device communications in wireless communication systems.

BACKGROUND

In wireless networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network and the EPC network may forward the data packet to another base station or to the same base station that is serving another UE. Data transfer between the UEs is routed through the base station and the EPC. The communication between the UEs is controlled by the policies set by the operator administering the network.

The UEs may communicate directly with each other using other radio access technology (RAT), such as, wireless local area network (WLAN) or Bluetooth when the UEs are located in close proximity and have access to the other RAT. However, this requires the availability of the other RAT and the capability of the UEs to operate in the other RAT. Moreover, handover from cellular technology to other RATs may result in service interruption and dropped calls.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

The present disclosure is directed to systems, methods, and apparatuses for inter-device communication in cellular wireless communication systems. In the current cellular communication system, data transfer between UEs has to be routed through a base station and a core network. When UEs located in close proximity communicate with each other, it would be advantageous for the UEs to communicate via a direct inter-device communication link between them, instead of transferring the data via a network. By providing a direct inter-device communication link between the UEs, improved overall spectral efficiency may be achieved. Moreover, the direct link between the UEs requires lower transmit power at the UE compared to transmitting to the base station, thereby resulting in battery savings at the UEs. Additionally, communicating over the direct link between the UEs may improve quality of service (QoS).

Although the UE may be able to communicate over a direct communication link using other RAT, such as, WLAN, Bluetooth, etc., it requires availability of the services of the other RAT and also requires implementation of other RAT at the UE. Furthermore, service interruptions and dropped calls may result from switching or handover between different RATs. Therefore, it may be advantageous to enable communications over the inter-device communication link using the same cellular radio access technology and operating in the same radio band.

Reference will now be made in detail to example approaches implemented according to the disclosure; the examples are illustrated in the accompanying drawings. Wherever possible, the same reference numbers will be used throughout the drawings to refer to the same or like parts.

Figure 1:
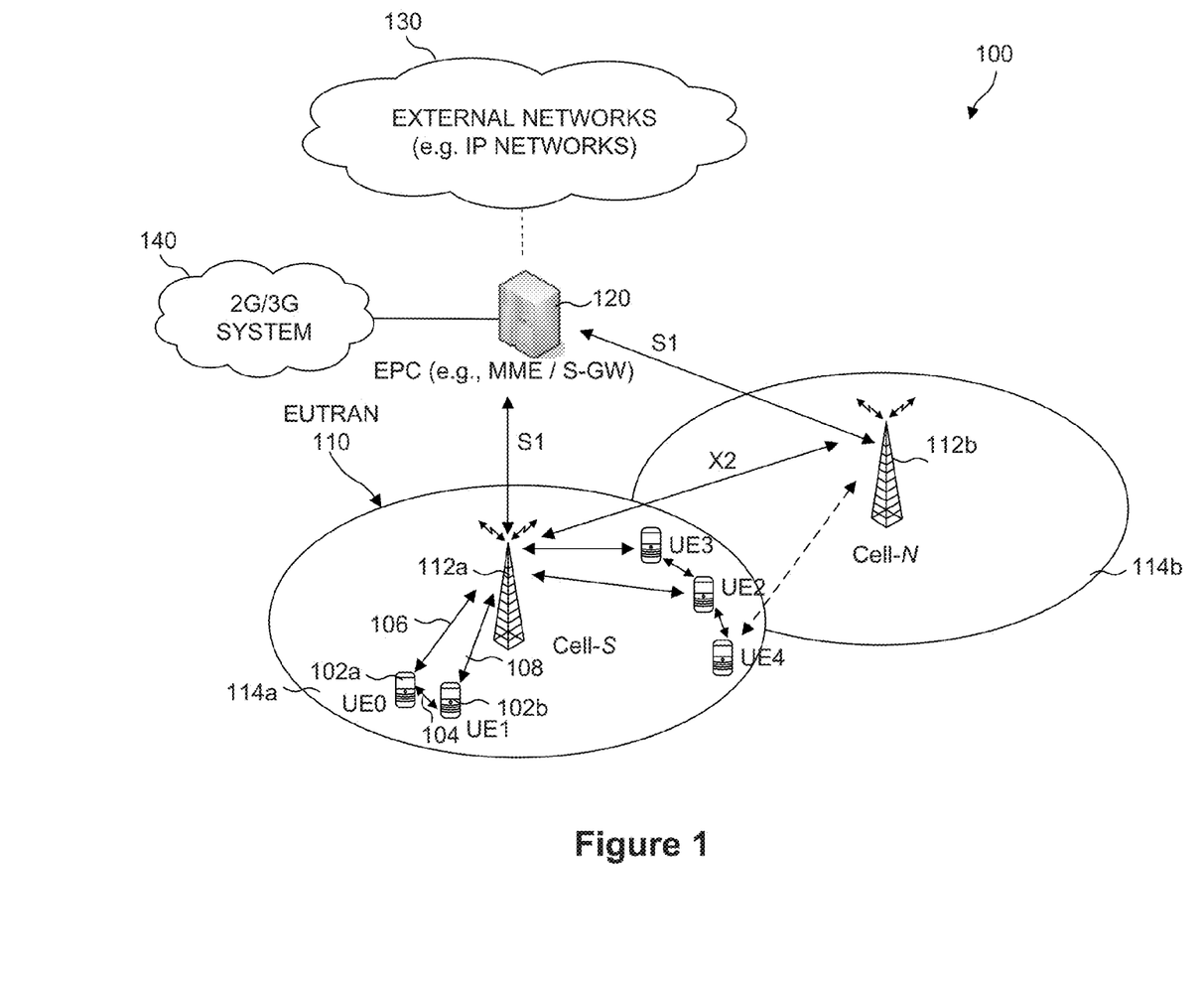
FIG. 1 illustrates an example cellular wireless communication system in which methods and systems consistent with the present disclosure may be implemented.

FIG. 1 illustrates an example cellular wireless communication system 100 in which systems and methods consistent with this disclosure may be implemented. The cellular network system 100 shown in FIG. 1 includes one or more base stations (i.e., 112a and 112b). In the LTE example of FIG. 1, the base stations are shown as evolved Node Bs (eNBs) 112a and 112b, although base stations operate in any wireless communications system, including for example, macro cell, femto cell, relay cell, and pico cell. Base stations are nodes that can relay signals for mobile devices, also referred to herein a user equipment, or other base stations. The base stations are also referred to as access node devices. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown one or more mobile electronic devices 102a, 102b operate within the LTE system 100. In some implementations, 2G/3G systems 140, e.g., Global System for Mobile communication (GSM), Interim Standard 95 (IS-95), Universal Mobile Telecommunications System (UMTS) and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. User equipment (UEs) 102a and 102b operate in Cell 114a and are served by eNB 112a. The EUTRAN 110 can include one or more eNBs (e.g., eNB 112a and eNB 112b) and one or more UEs (e.g., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one serving eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b such that handover may be conducted if one or both of the UEs 102a and 102b travels, e.g. from cell 114a to cell 114b. The UEs 102a and 102b may be any wireless electronic device used by an end-user to communicate, for example, within the LTE system 100.

The UEs 102a and 102b may transmit voice, video, multimedia, text, web content and/or any other user/client-specific content. The transmission of some content, e.g., video and web content, may require high channel throughput to satisfy the end-user demand. In some instances, however, the channel between UEs 102a, 102b and eNBs 112a, 112b may be contaminated by multipath fading due to the multiple signal paths arising from many reflections in the wireless environment. Accordingly, the UEs' transmission may adapt to the wireless environment. In short, the UEs 102a and 102b may generate requests, send responses or otherwise communicate in different means with Evolved Packet Core (EPC) 120 and/or Internet Protocol (IP) networks 130 through one or more eNBs 112a and 112b.

In some implementations consistent with the present disclosure, the UEs 102a and 102b may communicate over an inter-device communication link when they are located in close proximity to one another, without routing the data through the eNB 112a. The boundary of the distance of the inter-device communication link may be limited by the transmission power of the UEs. In one example, close proximity could be a few meters. In another example, close proximity could be tens of meters. It is also possible that in certain circumstances, the close proximity may mean larger distance such as hundreds of meters. For example, the UEs 102a and 102b may communicate directly over the inter-device communication link 104, instead of communicating with each other through their links with the eNB 112a, i.e., 106 and 108 respectively. The inter-device communication link may also be referred to as a device-to-device (D2D) communication link. The UEs 102a and 102b may simultaneously maintain an active communication link with the eNB 112a such that the UEs 102a and 102b may still receive messages from the eNB or other UEs, when communicating with each other over the direct inter-device link.

Examples of UEs include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all, or at least some, radio related functions in a fixed part of the system. One or more of eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b may directly communicate with one or more UEs 102a, 102b, other eNBs, and the EPC 120.

The eNBs 112a and 112b may be the end point of the radio protocols towards the UEs 102a, 102b and may relay signals between the radio connection and the connectivity towards the EPC 120. The communication interface between the eNB and the EPC is often referred to as an S1 interface. In certain implementations, EPC 120 is a central component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
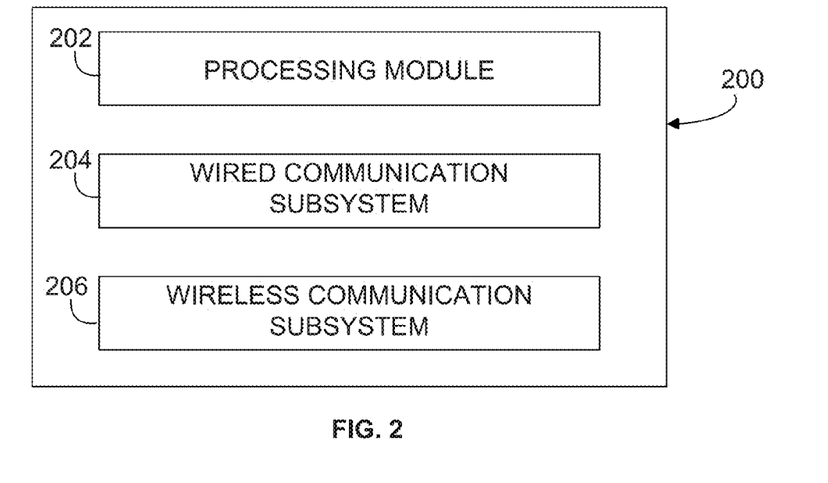
FIG. 2 illustrates an example access node device, in accordance with an embodiment of the present disclosure.

FIG. 2 illustrates an example access node device 200 consistent with certain aspects of this disclosure. The access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing IDC interference. The processing module 202 can also include other auxiliary components, such as random access memory (RAM), read only memory (ROM), secondary storage (for example, a hard disk drive or flash memory).

Additionally, the processing module 202 can execute certain instructions and commands to provide wireless or wired communication, using the wired communication subsystem 204 or a wireless communication subsystem 206. One skilled in the art will readily appreciate that various other components can also be included in the example access node device 200.

Figure 3:
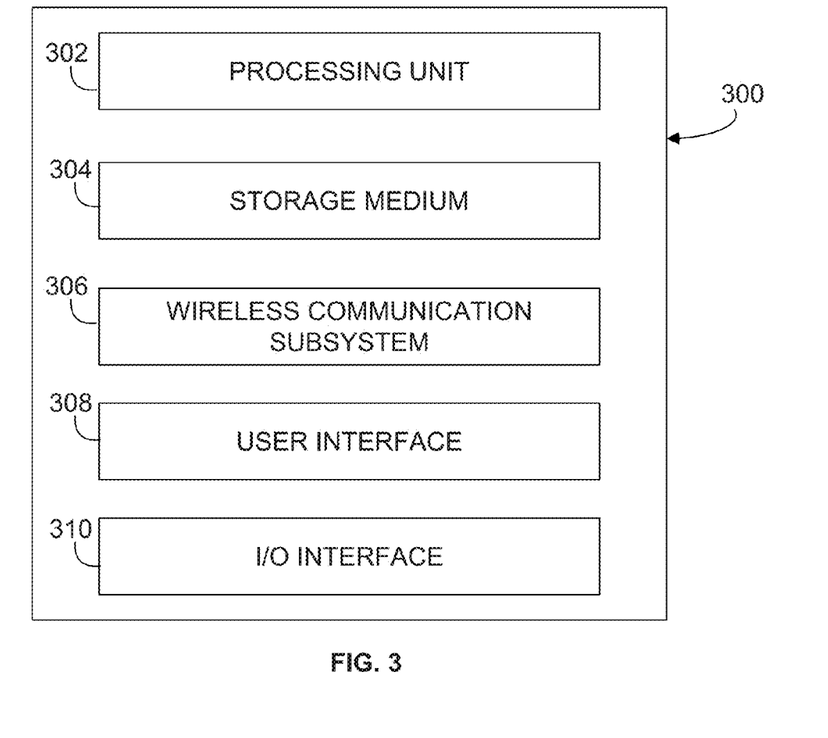
FIG. 3 illustrates an example user equipment device, in accordance with an embodiment of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 may include components and perform functionality similar to the processing module 202 described with regard to FIG. 2. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 may receive or transmit information over a direct inter-device communication link. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 can include, for example, a universal serial bus (USB) interface. One skilled in the art will readily appreciate that various other components can also be included in the example UE device 300.

For UEs to communicate over a direct inter-device communication link, an inter-device communication link is enabled between the UEs. The direct inter-device communication link allows data exchange between the UEs, without routing through the base station and the core network. Descriptions will now be made about methods for initiating the inter-device communication link in the cellular wireless communication system, according to certain embodiments of the present disclosure.

Figure 4:
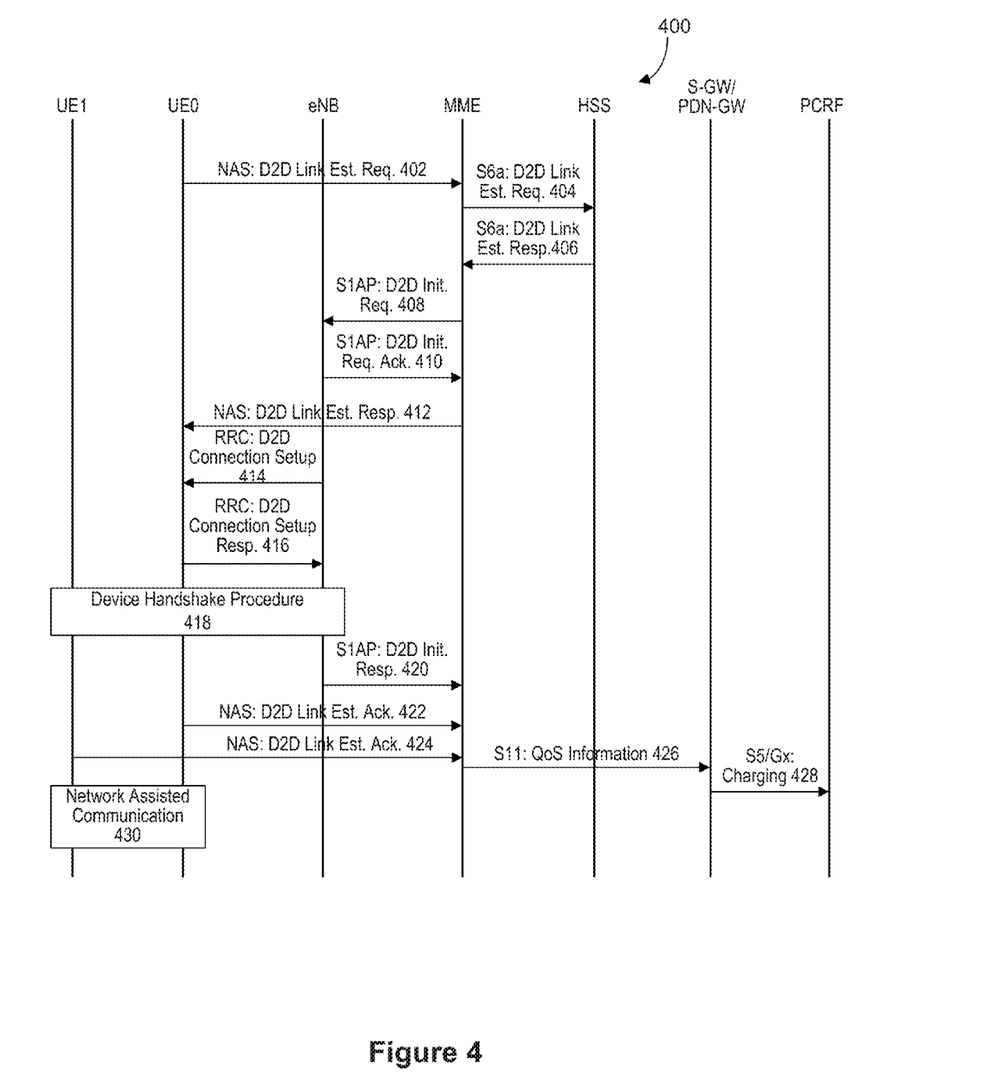
FIG. 4 illustrates a flow diagram of an example method for initiating an inter-device communication link consistent with the present disclosure.

FIG. 4 illustrates a flow diagram 400 of an example method for initiating an inter-device communication link consistent with the present disclosure. As shown in FIG. 4, the establishment of the inter-device communication link may be initiated by a UE. In the illustrated example method, UE0 desires a direct communication link with UE1, which may be located near UE0. UE0 can request the network to setup a direct communication link with a proximate device, for example, to allow users located close by to share data, to play an interactive game, etc. Thus, UE0 sends a non-access stratum (NAS) message to an MME to initiate a direct device-to-device (D2D) link with UE1 at 402. As an example, the NAS message to initiate the D2D link with other UEs may be called a D2D Link Establishment Request message.

The D2D Link Establishment Request message may include specific information for the direct communication link, for example, bandwidth requirements, data rate information, quality of service (QoS) information, time duration, etc., for the direct inter-device communication link. The NAS message may also include information of the other UE involved in the direct inter-device communication link. For example, the NAS message may include the UE identification (ID) information of the other UE, i.e., UE1, in the illustrated example. UE0 may obtain UE1's identity by, for example, scanning an ID bar code, which includes UE1's phone number or other identities. UE0 may also obtain UE1's identity by other alternatives, such as Email, Text, Near Field Communication (NFC), etc. UE0 and UE1 may also form a group and information regarding UEs in the group may be stored at the UEs. Hence when UE0 and UE1 are in close proximity to one another, the ID information of UE0 and UE1 can be obtained to initiate the inter-device communication. The group may include more than 2 users. For example, an interactive group may consist of 10 or more users. The number of users in the group can be pre-determined by the network. The upper limit on the group size could be pre-set, for example, in the standards or by the operators. The group member information can be updated when there is a change to the group membership, such as the addition or deletion of a group member, or a change in the information associated with one or more members. The group and/or information regarding the group may be maintained on the application layer.

After receiving the NAS message from UE0, the MME may forward the UE request to the home subscriber server (HSS) in a D2D Link Establishment Request message at 404. The communication interface between the MME and the HSS may be referred to as an S6a interface. The MME may also include information about the UE in the D2D Link Establishment Request message sent to the HSS at 404.

After receiving the message from the MME, the HSS may check the QoS requirements requested by the UE for the inter-device communication link and send a D2D Link Establishment Response message to the MME at 406. If the HSS responds negatively to the MME, the MME may send a NAS D2D Link Establishment Response message to UE0 with a negative acknowledgment, indicating an unsuccessful establishment of the inter-device communication link. In the NAS message, the MME may also indicate the cause for the rejection. Consequently, UE0 may re-initiate the inter-device communication link based on the cause.

On the other hand, if the HSS responds positively to the MME at 406, indicating an acceptance of the UE0's request for a direct communication link with UE1, the MME may subsequently send a D2D Initialization Request message to UE0's serving eNB at 408 for enabling the direct communication link between UE0 and UE1. The communication interface between the MME and the eNB is referred to as an S1 interface. The MME may include the QoS requirements of the direct communication link between UE0 and UE1 in the D2D Initialization Request message. The eNB may check the QoS requirements of the requested inter-device link and available radio resources at the eNB. The eNB may then determine whether the direct communication link between UE0 and UE1 can be enabled based on the QoS requirements and the available radio resources. Correspondingly, the eNB may send a D2D Initialization Request Acknowledgement message to the MME via the S1 application protocol (AP) at 410, including a positive or negative acknowledgement. The eNB may include reasons for rejecting the D2D initialization request in the D2D Initialization Request Acknowledgement message when a negative acknowledgement is sent to the MME.

If the MME receives a positive acknowledgement from the eNB at 410, the MME may send a D2D Link Establishment Response message with a positive acknowledgment to UE0 at 412, indicating an acceptance of the request from UE0 to initiate a direct communication link with UE1. The MME may include any changes in the QoS policies in the D2D Link Establishment Response message. If the MME receives a negative acknowledgement from the eNB at 410, the MME may send a D2D Link Establishment Response message with a negative acknowledgment to UE0 at 412, indicating a rejection of the request from UE0 to initiate a direct communication link with UE1.

When the eNB determines that the direct communication link between UE0 and UE1 may be enabled, the eNB sends a radio resource control (RRC) message D2D Connection Setup to UE0 at 414. The eNB may use the Cell radio network temporary identity (C-RNTI) of UE0 to send this RRC message to UE0 at 414. The D2D Connection Setup message may include transmission parameters for the direct communication link, such as a C-RNTI of UE1, temporary transmit point identifications for each UE communicating over the inter-device communication link, minimum and maximum transmit power levels for transmitting over the inter-device communication link, a device-to-device radio network temporary identity (DD-RNTI) for identifying the direct inter-device link, a transmit power step for the direct inter-device link, a guard time for the direct inter-device link, etc.

Subsequent to receiving the D2D Connection Setup message from the eNB, UE0 may send a D2D Connection Setup Response message to the eNB at 416, indicating a successful reception of the D2D Connection Setup message. In another example, the eNB may also send an RRC message D2D Connection Setup to UE1 which includes the similar information such as DD-RNTI. Subsequent to receiving the D2D Connection Setup message from the eNB, UE1 may also send a D2D Connection Setup Response message to the eNB, indicating a successful reception of the D2D Connection Setup message. After receiving the D2D Connection Setup Response message from both UE0 and UE1, the eNB may initiate a device handshake procedure with UE0 and UE1 at 418. During this procedure, the UEs identify each other and initiate link parameter tuning such that a reliable communication link can be established between the UEs.

On the other hand, if the eNB does not receive the D2D Connection Setup Response message from UE0 or UE1 over a predetermined time period, the eNB may resend the D2D Connection Setup message to UE0 or UE1. After resending the D2D Connection Setup for a predetermined number of times, the eNB may abandon the direct link setup procedure for the link between UE0 and UE1 and send a D2D Initialization Response message to the MME, indicating a failure to contact UE0 or UE1. The predetermined number could be pre-set, e.g., by the operators. A prohibit timer could also be used to regulate the transmission of the D2D Connection Setup messages. Basically, after the eNB sends out the D2D Connection Setup message, the eNB cannot send another D2D Connection Setup message until the prohibit timer is expired.

Upon successful completion of the device handshake procedure, the eNB may send a D2D Initialization Response message to the MME at 420, indicating a completion of the device handshake procedure. UE0 and UE1 may also send a D2D Link Establishment Acknowledgement message to the MME at 422 and 424, respectively, indicating a successful completion of the device handshake procedure. Consequently, the MME may communicate the QoS requirements of the direct inter-device link to the serving gateway (S-GW) at 426. The serving gateway may then forward this QoS information to the policy and charging rules function (PCRF) for charging the UEs at 428. In some implementation, the MME may communicate the QoS requirements of the direct inter-device link to the PCRF via the S-GW at an earlier time, for example, subsequent to receiving the positive acknowledgment from the eNB at 410.

Upon successful completion of the device handshake procedure, the eNB may also determine and communicate the specifics of resources to be used for the inter-device link to UE0 and UE1. The network assisted inter-device communication between UE0 and UE1 may then be conducted over the direct inter-device communication link at 430. LTE downlink or uplink radio resources may be used for the inter-device communications between the UEs. Because of the close proximity between the UEs, the signal to interference plus noise ratio (SINR) of the inter-device communication link may be higher than the SINRs of links between the UEs and their respective serving base stations, resulting in better communication quality and more efficient radio resource usage on the inter-device communication link.

In certain instances, the resources assigned by the eNB may be time limited and this time limitation may be set based on the requested application or the UE's request for specific bandwidth for the direct inter-device communication link. The UE may extend this time limit by, for example, sending another request or a NAS update request to the MME for extension. Similarly the UE may want to request modification to the QoS or want to add a new UE to the ongoing inter-device communication. The MME may send a NAS update response message to the UE subsequently. The UE may send the NAS update request message to the MME for extension of the time duration of the inter-device communication, modification to quality of service, addition of one or more other UEs to the inter-device communication link, or other updates related to the inter-device communication link.

If the UE wishes to terminate the inter-device communication at an earlier time before the time limit, the UE may send a message to the MME and subsequently the MME can instruct the eNB to stop the radio resource assignment to the UE for the inter-device communication. In some implementations, the UE may receive an indication that the inter-device communication link is to be terminated. The indication may be received from a user interface, from the network, or from a physical layer of the UE. After the inter-device link is terminated, MME/SGW may send a report to the PCRF, reporting the amount of data transmitted on the direct inter-device link, the actual duration of the communication over the direct inter-device link, etc for charging purpose.

The method described above in connection with FIG. 4 is a UE initiating an inter-device communication method, in which a UE identifies an opportunity for direct inter-device communication and requests the network to set up the inter-device communication. In some scenarios, the network may also identify the feasibility of direct inter-device communication and initiate the inter-device communication link.

Figure 5:
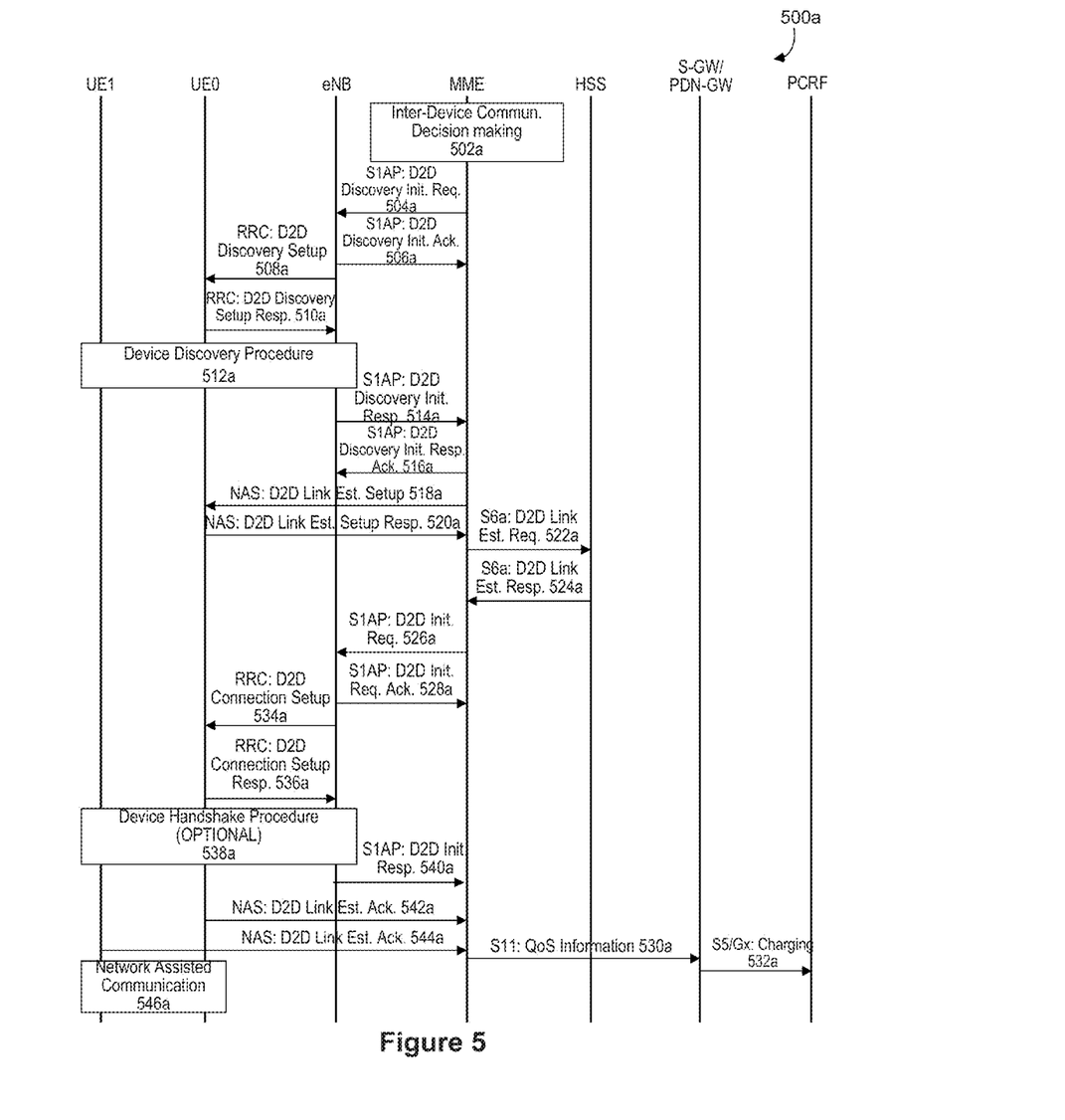
FIG. 5 illustrates a flow diagram of another example method for initiating an inter-device communication link consistent with the present disclosure.

FIG. 5 illustrates a flow diagram 500a of an example method for initiating an inter-device communication link consistent with the present disclosure. As shown in FIG. 5, the MME performs inter-device communication decision making at 502a. At 502a, the MME may determine feasibility of the inter-device communication link between the UEs. For example, the MME may make decisions of setting up a direct inter-device communication link based on the UEs' geographical locations. The UEs may report their geographical locations to the network periodically when the UEs are equipped with certain navigation systems, such as global positioning system (GPS). In some implementations, the network may obtain knowledge of the UEs' location based on measurement reports sent from the UEs and geographical locations of the corresponding base stations.

In some other implementations, the base station may determine the UEs' locations based on pre-set configurations via operation and maintenance (O&M) for certain groups of UEs and then report this location information to the EPC. A location update report may be sent periodically, or may be triggered by one or more events to provide updated location information to the network. The events may be related to the rate of the UE changing its location, e.g., related to the physical speed of the UE. Furthermore, the location update report can be serving cell specific, i.e., based on the specific serving base station, or can be specific to one or more UEs.

Based on the location information available at the MME, if an incoming call or connection request identifies UEs that are close by, the network may initiate an inter-device communication link. Specifically, if an incoming call or connection request identifies one or more UEs with which the requesting UE can effectively communicate directly, as opposed to, or in addition to, going through the network, the network may initiate an inter-device communication link. For example, if an incoming call or connection request identifies UEs that are located near the requesting UE, the network may initiate an inter-device communication link. In FIG. 5, S1-AP represents S1 Application Protocol, which is used on the control plane between the eNB and the MME. MME may also contact HSS to determine whether the device is authorized to take part in an inter-device communication. The device authorization may be location dependent. If the MME decides to initiate an inter-device communication link at 502a, the MME may send a D2D Discovery Initialization Request message to the UEs' serving eNB at 504a, requesting the eNB to initiate a device discovery procedure. The device discovery procedure is to confirm whether the UEs can indeed communicate with each other over a direct inter-device communication link.

After receiving the D2D Discovery Initiation Request message from the MME, the eNB may subsequently send a D2D Discovery Initiation Request Acknowledgement message to the MME at 506a. The D2D Discovery Initiation Request Acknowledgement message may be used to confirm whether a device discovery procedure will be conducted by the eNB.

If the eNB confirms to conduct a device discovery procedure at 506a, the eNB may initiate the device discovery procedure by sending an RRC D2D Discovery Setup message to UE0 at 508a. This message may include one or more of the following parameters: cell radio network temporary identities (C-RNTIs) of the UEs participating in the inter-device communication; temporary transmit point IDs for each UE participating in the inter-device communication; minimum and/or maximum transmit power levels for transmitting over the direct inter-device communication link; a DD-RNTI which is used to identify the direct inter-device communication link; a transmit power step for transmissions over the direct link; and a guard time for the direct communication link.

After receiving the D2D Discovery Setup message from the eNB, UE0 may send a D2D Discovery Setup Response message to the eNB at 510a. The message may indicate a successful reception of the D2D Discovery Setup message. Additionally, or alternatively, the eNB may send an RRC D2D Discovery Setup message to UE1 which may include similar information such as DD-RNTI. Subsequent to receiving the D2D Discovery Setup message from the eNB, UE1 may also send a D2D Discovery Setup Response message to the eNB, indicating a successful reception of the D2D Discovery Setup message. After receiving the D2D Discovery Setup Response message from UE0 and/or UE1, the eNB may initiate a device discovery procedure with UE0 and UE1 at 512a. On the other hand, if the eNB does not receive the D2D Discovery Setup Response message from UE0 or UE1 over a predetermined time period, the eNB may resend the D2D Discovery Setup message to UE0 or UE1. After resending the D2D Discovery Setup message a number of times, the eNB may abandon the direct link discovery procedure for the link between UE0 and UE1 and indicate a failure of the device discovery in the D2D Discovery Initialization Response message to the MME with clause set as "UEs not responding". Transmission of a D2D Discovery Initialization Response message is shown in FIG. 5 at 514a. The number of times for resending the D2D Discovery Setup message may be predetermined or configurable by the eNB.

Upon a successful discovery, the eNB may send a D2D Discovery Initialization Response message to the MME at 514a. The message may indicate a successful discovery of the UEs that may communicate over a direct inter-device communication link. If the device discovery procedure is failed, the eNB may indicate a failure of the device discovery in the D2D Discovery Initialization Response message to the MME.

Subsequent to receiving the D2D Discovery Initialization Response message from the eNB, the MME may send a D2D Discovery Initialization Response Acknowledgement message to the eNB at 516a, confirming a successful reception of the D2D Discovery Initialization Response message. If the D2D Discovery Initialization Response message indicates a successful device discovery, the MME may send a NAS D2D Link Establishment Setup message to UE0 at 518a. After receiving the D2D Link Establishment Setup message from the MME, UE0 may send a D2D Link Establishment Setup Response message to the MME at 520a, confirming that the D2D Link Establishment Setup message is received at the UE. Subsequent signaling procedures to enable the direct inter-device communication link may be similar to the procedure described previously in connection with FIG. 4.

After receiving the D2D Link Establishment Setup Response message from UE0, the MME may send a D2D Link Establishment Request message to the HSS at 522a. The MME may also include information describing the UE in the D2D Link Establishment Request message sent to the HSS at 522a.

After receiving the message from the MME, the HSS may check the QoS requirements of the inter-device communication link and send a D2D Link Establishment Response message to the MME at 524a. If the HSS responds positively to the MME at 524a, the MME may subsequently send a D2D Initialization Request message to the eNB at 526a for enabling the direct communication link between UE0 and UE1. The MME may include the QoS requirements of the direct communication link between UE0 and UE1 in the D2D Initialization Request message. The eNB may check the QoS requirements of the requested inter-device link and available radio resources at the eNB. The eNB may determine whether a direct communication link between UE0 and UE1 can be enabled based on the QoS requirements and the available radio resources. Correspondingly, the eNB may send a D2D Initialization Request Acknowledgement message to the MME via the S1 AP at 528a, including a positive or negative acknowledgement. The eNB may include reasons for rejecting the D2D initialization request in the D2D Initialization Request Acknowledgement message when a negative acknowledgement is sent to the MME.

When the eNB determines that the direct communication link between UE0 and UE1 may be enabled, the eNB may send an RRC D2D Connection Setup message to UE0 at 534a. The D2D Connection Setup message may include one or more transmission parameters for the direct communication link, such as a C-RNTI of UE1, temporary transmit point identifications for each UE communicating over the inter-device communication link, minimum and/or maximum transmit power levels for transmitting over the inter-device communication link, a DD-RNTI for identifying the direct inter-device link, a transmit power step for the direct inter-device link, a guard time for the direct inter-device link, etc.

Subsequent to receiving the D2D Connection Setup message from the eNB, UE0 may send a D2D Connection Setup Response message to the eNB at 536a, indicating a successful reception of the D2D Connection Setup message. In another example, the eNB may also send a radio resource control (RRC) message D2D Connection Setup to UE1 as well which includes the similar information such as DD-RNTI. Subsequent to receiving the D2D Connection Setup message from the eNB, UE1 may also send a D2D Connection Setup Response message to the eNB, indicating a successful reception of the D2D Connection Setup message. After receiving the D2D Connection Setup Response message from UE0 and/or UE1, the eNB may initiate a device handshake procedure with UE0 and UE1 at 538a. During this procedure, the UEs may identify each other and initiate link parameter tuning such that a reliable communication link can be established between the UEs. In some implementations, the device handshake procedure may be omitted when the direct inter-device communication is initiated by the network and a device discovery procedure has been conducted. It may be possible to omit the device handshake procedure in certain scenarios because the UE may have already identified each other and performed link parameter tuning during the device discovery procedure at 512a.

On the other hand, if the eNB does not receive the D2D Connection Setup Response message from UE0 or UE1 within a predetermined time period, the eNB may resend the D2D Connection Setup message to UE0 or UE1. After resending the D2D Connection Setup a predetermined number of times, the eNB may abandon the direct link setup procedure for the link between UE0 and UE1 and send a D2D Initialization Response message to the MME, indicating a failure to contact UE0 or UE1. The predetermined number could be pre-set, e.g., by the operators. A prohibit timer could also be used to regulate the transmission of the D2D Connection Setup messages. Basically, after the eNB sends out the D2D Connection Setup message, the eNB cannot send another D2D Connection Setup message until the prohibit timer is expired.

Upon successful completion of the device handshake procedure, the eNB may send a D2D Initialization Response message to the MME at 540a, indicating a completion of the device handshake procedure. UE0 and UE1 may also send a D2D Link Establishment Acknowledgement message to the MME at 542a and 544a, respectively, indicating a successful completion of the device handshake procedure. Consequently, the MME may communicate the QoS requirements of the direct inter-device link to the serving gateway (S-GW) at 530. The serving gateway may then forward this QoS information to the Policy and Charging Rules Function (PCRF) for charging or billing the UEs at 532a. In some implementations, the MME may communicate the QoS requirements of the direct inter-device link to the PCRF via the S-GW at an earlier time, for example, subsequent to receiving the positive acknowledgment from the eNB at 528a. The network assisted inter-device communication between UE0 and UE1 may then be conducted over the direct inter-device communication link at 546a. LTE downlink or uplink resources may be used for the inter-device communications between the UEs.

The resources assigned by the eNB may be time limited, as explained above, and this time limit may be set based on a requested application or a UE's request for specific bandwidth for the direct inter-device link. The UE may extend this time limit by, for example, sending another request or a NAS update request to the MME for extension. The MME may send a NAS update response message to the UE subsequently. The UE may send the NAS update request message to the MME for extension of the time duration of the inter-device communication, modification to quality of service, addition of one or more other UEs to the inter-device communication link, or other updates related to the inter-device communication link. If the UE wishes to terminate the inter-device communication at an earlier time before the time limit, the UE may send a message to the MME and subsequently the MME can instruct the eNB to stop the radio resource assignment to the UE for the inter-device communication. In some implementations, the UE may receive an indication that the inter-device communication link is to be terminated. The indication may be received from a user interface, from the network, or from a physical layer of the UE. After the inter-device link is terminated, MME/SGW may send a report to the PCRF, reporting link related information or statistics, such as the amount of data transmitted on the direct inter-device link, the actual duration of the communication over the direct inter-device link, etc for charging purpose.

The systems and methods described above may be implemented by any hardware, software or a combination of hardware and software having the above described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Methods may be practiced with steps performed in an order that may differ from that presented herein.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method at a user equipment (UE) for wireless communication, comprising:
   sending, at the UE, a non-access stratum (NAS) request message to a network entity that initiates an inter-device communication link, wherein the network entity is a mobility management entity (MME);
   receiving, at the UE and from the MME, a NAS response message associated with inter-device communication between two or more UEs, wherein the NAS response message includes at least one of an acceptance or a rejection of the NAS request message;
   receiving a radio resource control (RRC) inter-device connection setup message from a base station, wherein the RRC inter-device connection setup message indicates at least two cell radio network temporary identities (C-RNTIs), and each of the at least two C-RNTIs correspond to a different UE of the two or more UEs; and
   sending a RRC inter-device connection setup response message to the base station.

2. The method of claim 1, wherein the RRC inter-device connection setup message includes at least one of:
   temporary transmit point identifications for the two or more UEs;
   minimum and maximum transmit power levels for the two or more UEs communicating over the inter-device communication link;
   a device-to-device radio network temporary identity (DD-RNTI);
   a transmit power incremental value for the two or more UEs communicating over the inter-device communication link; or
   a guard time.

3. The method of claim 1, further comprising:
   performing a device handshake procedure; and
   sending a NAS message to the network entity for acknowledging an establishment of the inter-device communication link.

4. The method of claim 1, wherein the NAS request message includes at least one of:
   identifications of at least one of the two or more UEs;
   a bandwidth requirement for the inter-device communication link;
   data rate information for the inter-device communication link;
   quality of service information for the inter-device communication link; or
   a time duration of the inter-device communication link.

5. The method of claim 1, wherein a signal to interference plus noise ratio (SINR) of the inter-device communication link is higher than at least one of SINRs of links between the two or more UEs and their respective serving base stations.

6. The method of claim 1, wherein the two or more UEs communicate over the inter-device communication link using long term evolution (LTE) downlink resources.

7. The method of claim 1, wherein the two or more UEs communicate over the inter-device communication link using long term evolution (LTE) uplink resources.

8. The method of claim 1, wherein the two or more UEs maintain communication links with their respective serving base stations while communicating over the inter-device communication link.

9. The method of claim 1, further comprising:
   sending, at the UE, a NAS update request message to the network entity for modifying or extending a time duration of the inter-device communication link; and
   receiving, at the UE, a NAS update response message associated with the inter-device communication from the network entity.

10. The method of claim 9, wherein the UE sends the NAS update request message to the network entity upon an occurrence of one or more of the following:
    extension of the time duration of the inter-device communication;
    modification to quality of service; or
    addition of one or more UEs to the inter-device communication.

11. A method at a base station, comprising:
    receiving an initialization request message from a network entity for enabling at least one inter-device communication link for at least two user equipments (UEs), wherein the network entity is a mobility management entity (MME);
    determining that the at least one inter-device communication link can be enabled;
    sending, an initialization request acknowledgement message to the network entity, indicating that the at least one inter-device communication link can be enabled;
    sending, in response to the initialization request message and the determination that the at least one inter-device communication link can be enabled, a radio resource control (RRC) inter-device connection setup message to one of the at least two UEs, wherein the RRC inter-device connection setup message indicates at least two cell radio network temporary identities (C-RNTIs), and each of the at least two C-RNTIs correspond to a different UE of the at least two UEs; and
    receiving, in response to the radio resource control (RRC) inter-device connection setup message, a RRC connection setup response message from the one of the at least two UEs.

12. The method of claim 11, wherein the RRC inter-device connection setup message includes at least one of:
    temporary transmit point identifications for the at least two UEs;
    minimum and maximum transmit power levels for the at least two UEs;
    a device-to-device radio network temporary identity (DD-RNTI);
    a transmit power incremental value for the at least two UEs communicating over the at least one inter-device communication link; or
    a guard time.

13. The method of claim 11, further comprising:
    initiating a device handshake procedure with the at least two UEs; and
    sending an initialization response message to the network entity for acknowledging an establishment of the at least one inter-device communication link for the at least two UEs.

14. The method of claim 11, wherein a signal to interference plus noise ratio (SINR) of the at least one inter-device communication link is higher than one or more SINRs of links between the at least two UEs and the base station.

15. The method of claim 11, wherein the at least one inter-device communication link uses long term evolution (LTE) downlink resources.

16. The method of claim 11, wherein the at least one inter-device communication link uses long term evolution (LTE) uplink resources.

17. The method of claim 11, further comprising:
sending a radio resource control (RRC) inter-device connection setup message to one of the at least two UEs;
determining that a RRC inter-device connection setup response message from the one of the at least two UEs is not received during a predetermined time period; and
resending the radio resource control (RRC) inter-device connection setup message to the one of the at least two UEs.

18. The method of claim 11, wherein the base station determines whether the at least one inter-device communication link can be enabled based on available radio resources at the base station when receiving the initialization request message.

19. A user equipment (UE), comprising:
a transmitter that sends, at the UE, a non-access stratum (NAS) request message to a network entity that initiates an inter-device communication link, wherein the network entity is a mobility management entity (MME); and
a receiver that receives, at the UE and from the MME, a NAS response message associated with inter-device communication between two or more UEs, wherein the NAS response message includes at least one of an acceptance or a rejection of the NAS request message that initiates the inter-device communication link,
wherein the receiver receives a radio resource control (RRC) inter-device connection setup message from a base station, the RRC inter-device connection setup message indicates at least two cell radio network temporary identities (C-RNTIs), and each of the at least two C-RNTIs correspond to a different UE of the two or more UEs, and
the transmitter sends a RRC inter-device connection setup response message to the base station.

20. The UE of claim 19, wherein the two or more UEs communicate over the inter-device communication link using long term evolution (LTE) uplink resources.

21. The UE of claim 19, wherein the two or more UEs maintain communication links with their respective serving base stations while communicating over the inter-device communication link.

22. A base station, comprising:
a receiver that receives an initialization request message from a network entity for enabling at least one inter-device communication link for at least two user equipments (UEs), wherein the network entity is a mobility management entity (MME);
one or more processors configured to determine that the at least one inter-device communication link can be enabled;
a transmitter that sends an initialization request acknowledgement message to the network entity, indicating that the at least one inter-device communication link can be enabled, the transmitter sending, in response to the initialization request message and the determination that the at least one inter-device communication link can be enabled, a radio resource control (RRC) inter-device connection setup message to one of the at least two UEs, wherein the RRC inter-device connection setup message indicates at least two cell radio network temporary identities (C-RNTIs), and each of the at least two C-RNTIs correspond to a different UE of the at least two UEs; and
the receiver receiving, in response to the radio resource control (RRC) inter-device connection setup message, a RRC connection setup response message from the one of the at least two UEs.

23. The base station of claim 22, wherein the at least one inter-device communication link uses long term evolution (LTE) uplink resources.

24. The base station of claim 22, wherein the one of the at least two UEs maintains communication links with the base stations while communicating over the at least one inter-device communication link.

* * * * *

UNITED STATES PATENT AND TRADEMARK OFFICE
CERTIFICATE OF CORRECTION

PATENT NO. : 9,591,679 B2
APPLICATION NO. : 13/621703
DATED : March 7, 2017
INVENTOR(S) : Chandra Sekhar Bontu, Yi Song and Zhijun Cai It is certified that error appears in the above-identified patent and that said Letters Patent is hereby corrected as shown below:

On the Title Page

Column 1 (Applicant), Line 1, Delete "Blackberry Limited," and insert -- BlackBerry Limited, --, therefor.

Column 1 (Inventors), Line 2, Delete "Yu Song," and insert -- Yi Song, --, therefor.

Signed and Sealed this
Third Day of April, 2018

Andrei Iancu
*Director of the United States Patent and Trademark Office*